United States Patent [19]

Hughes

[11] Patent Number: 5,173,344
[45] Date of Patent: Dec. 22, 1992

[54] ARTICLE AND METHOD FOR SEALING SEAMS BETWEEN WATER BARRIER ARTICLES

[75] Inventor: John Hughes, Long Grove, Ill.

[73] Assignee: American Colloid Company, Arlington Heights, Ill.

[21] Appl. No.: 590,961

[22] Filed: Oct. 1, 1990

[51] Int. Cl.$^5$ .................... B32B 1/08; B32B 5/16; E02B 3/16

[52] U.S. Cl. .................... 428/36.1; 52/169.14; 405/107; 405/115; 428/225; 428/240; 428/241; 428/283; 428/454

[58] Field of Search ............ 428/34.3, 36.1, 240, 428/241, 283, 451, 454; 405/38, 107, 109, 115; 52/169.14

[56] References Cited

U.S. PATENT DOCUMENTS

| | | | |
|---|---|---|---|
| 4,103,499 | 8/1978 | Clem | 405/264 X |
| 4,209,568 | 6/1980 | Clem | 428/454 |
| 4,565,468 | 1/1986 | Crawford | 405/270 |
| 4,837,085 | 6/1989 | McGroarty | 428/451 |
| 5,041,330 | 8/1991 | Heerten et al. | 428/213 |

Primary Examiner—George F. Lesmes
Assistant Examiner—Christopher Brown
Attorney, Agent, or Firm—Marshall, O'Toole, Gerstein, Murray & Bicknell

[57] ABSTRACT

An article of manufacture including an elongate confined mass of a water-swellable clay for sealing joints or seams between adjacent water-barrier materials or for plugging defects or other unsealed areas adjacent to a water-barrier layer. The elongate, confined mass of water-swellable clay is manufactured in any desired cross-sectional shape or configuration e.g. circular, eliptical, rectangular, square, and the like and can be manufactured in roll form for dispensing individual confined masses of water-swellable clay individually. The water-swellable clay is confined within a layer of material that permits the entrance of water to contact the water-swellable clay for hydration of the clay, such as by being water-porous or water-soluble and such that upon sufficient hydration of the confined mass of water-swellable clay, the confining layer will dissolve sufficiently, burst or tear to permit relatively free movement of the hydrating and expanding water-swellable clay.

18 Claims, 3 Drawing Sheets

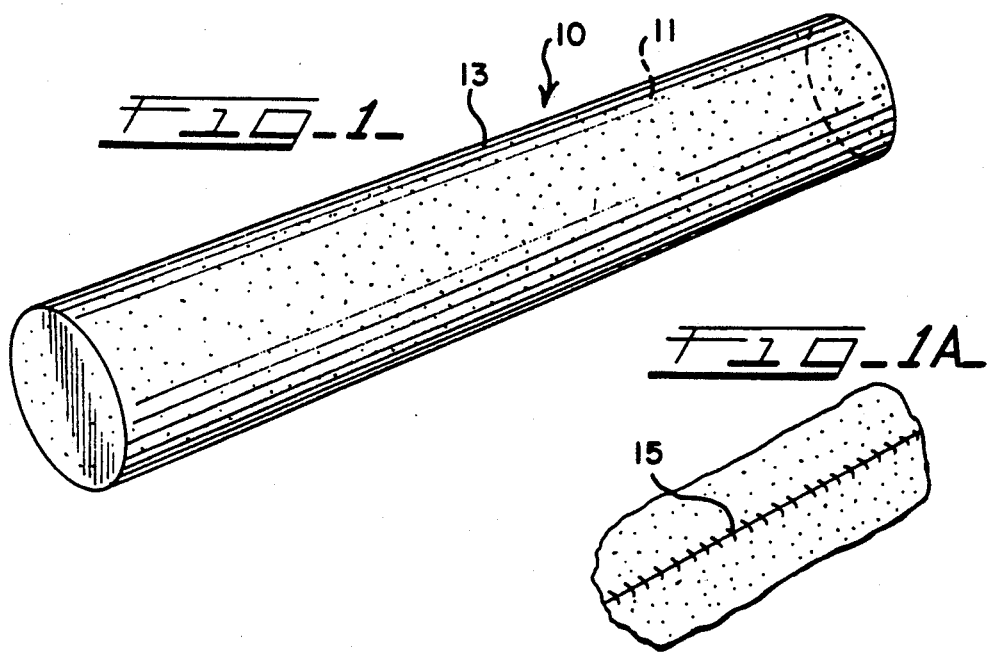
FIG_1
FIG_1A
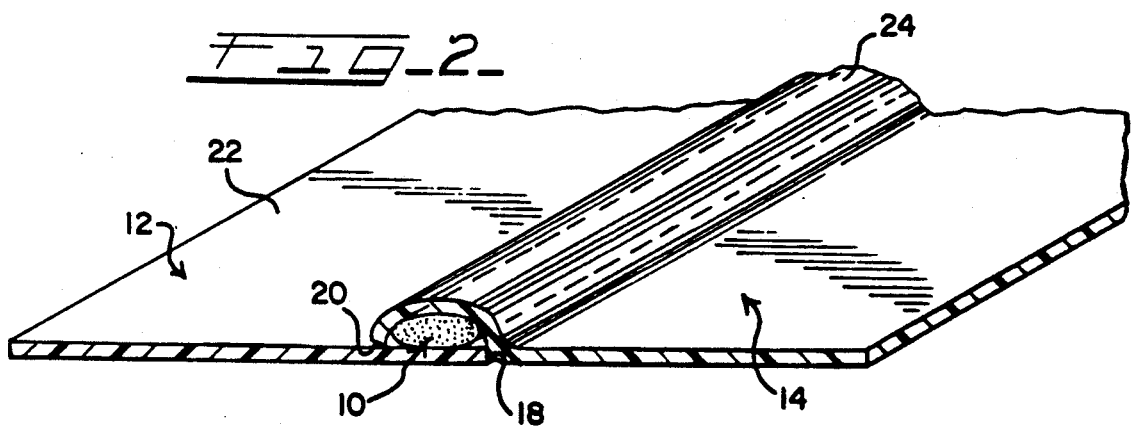
FIG_2
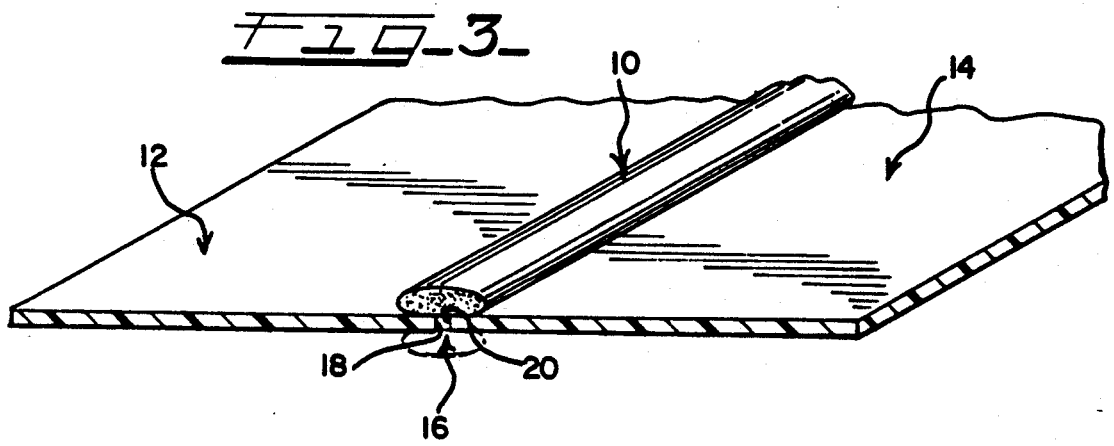
FIG_3

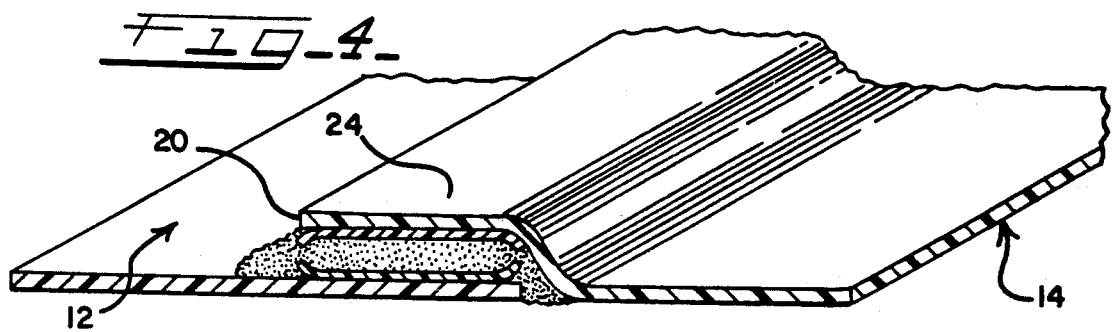
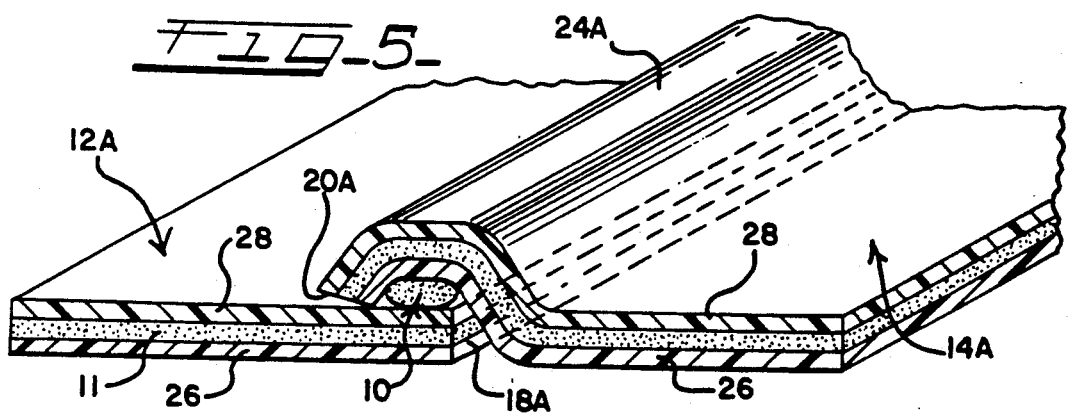
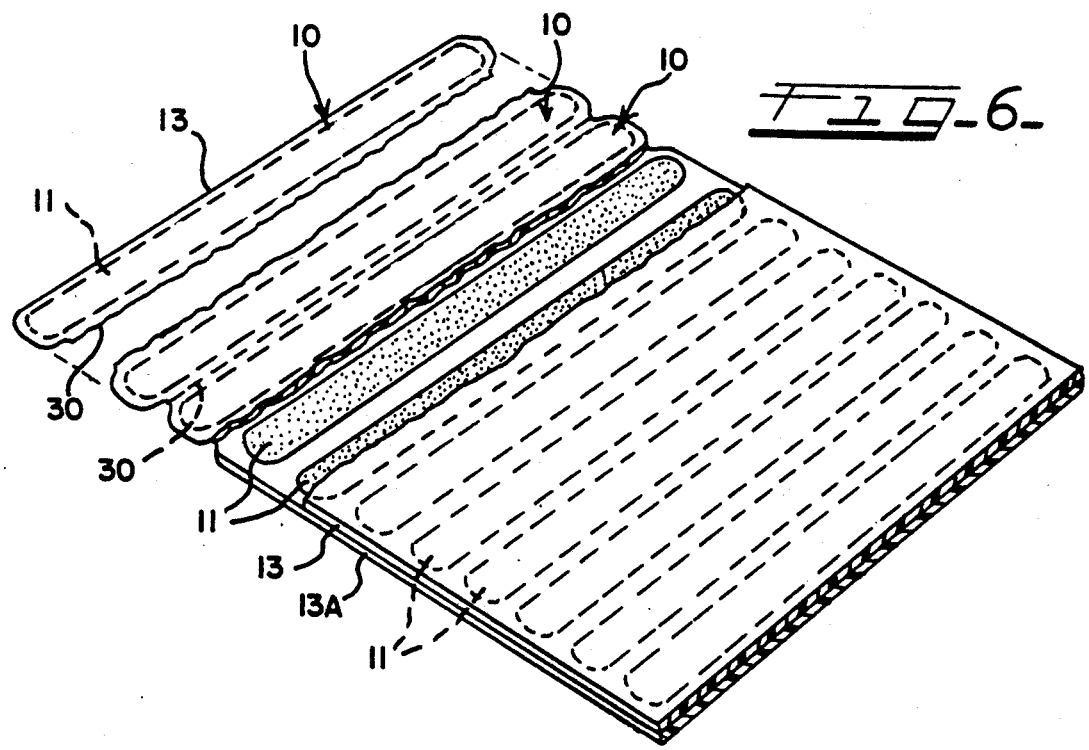

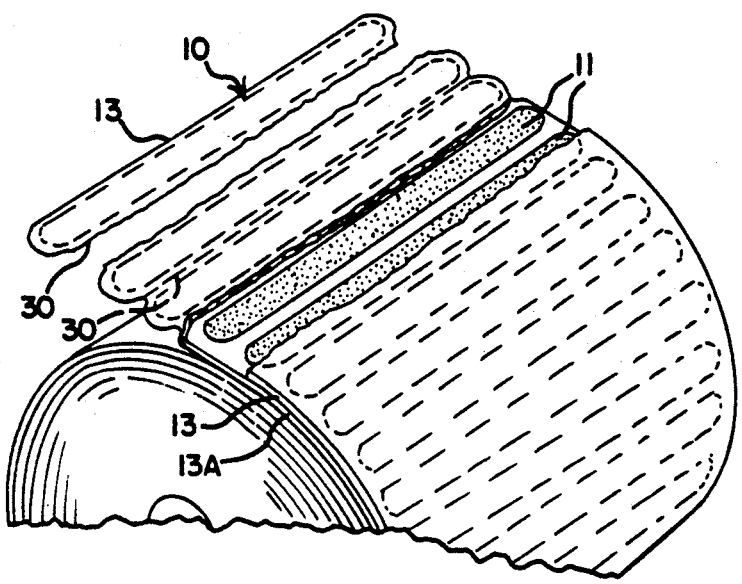
FIG_7_
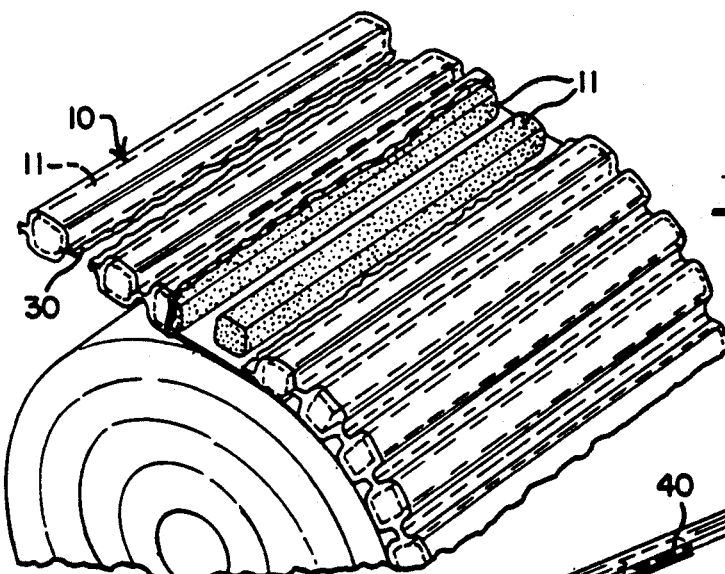
FIG_8_
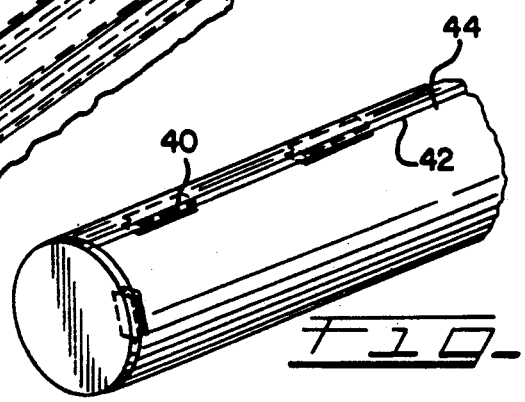
FIG_10_
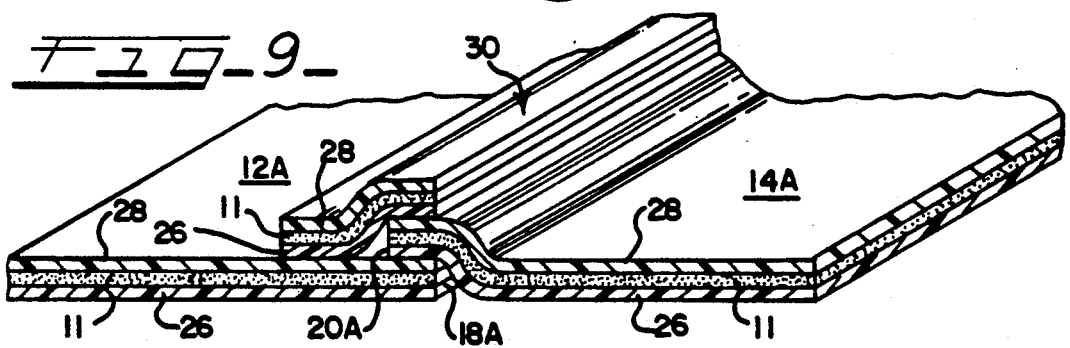
FIG_9_

ARTICLE AND METHOD FOR SEALING SEAMS BETWEEN WATER BARRIER ARTICLES

FIELD OF THE INVENTION

The present invention is directed to a confined mass of a water-swellable colloidal clay, such as bentonite, confined within a water-pervious or water-soluble continuous enveloping layer of material that will solubilize upon water contact or, upon hydration of bentonite, when water permeates the pores of the confining layer, the layer will burst, tear, or dissolve sufficiently to allow the water-swellable clay to expand laterally and longitudinally for sealing seams or joints between waterproofing layers of material. More particularly, the present invention is directed to an elongate article of manufacture in tube or rod form of any desired cross-sectional shape that is filled with a water-swellable colloidal clay and has an outer layer of enveloping material that confines the clay. The enveloping material is water-degradable e.g. water-soluble; or water-penetrable and has sufficiently low structural strength such that upon hydration of the interior clay, the enveloping material will burst, enabling the interior water-swellable clay to expand laterally to fill seams, joints, and overlap areas of adjacent water-sealing articles essentially without hindrance from the enveloping material.

BACKGROUND OF THE INVENTION AND PRIOR ART

It is well known to provide seepage resistant structures using water-swellable clays, such as bentonite, disposed across a path of possible seepage or flow and confining the clay within an article of manufacture installed in an area of possible seepage. For example, this assignee's Bechtner U.S. Pat. No. 2,277,286 discloses the use of bentonite clay filled between spaced forms or bulkheads, such as wood, masonry or other suitable materials to hold the bentonite in place. Another of this assignee's prior patents to Arthur G. Clem, U. S. Pat. No. 3,186,896 discloses a moisture-impervious panel preformed from spaced paperboard sheets interconnected with an intermediate layer of water-swellable clay, such as bentonite, that has been sold for may years by this assignee as a waterproofing barrier. When subjected to leakage or seepage of water, the outwardly extending water-pervious paper or cardboard facing sheet will absorb the water and pass the water through the facing sheet for contact with the intermediate layer of water-swellable clay thereby permitting the clay to hydrate, swell and block the passage of water completely through the panel. As set forth in the Clem U.S. Pat. No. 3,186,896, the facing sheets should have no openings which permit the escape of the compacted bentonite therethrough.

Further, various polymers, swellable clays, and articles of manufacture have been applied to the surface of soil to provide a waterproofing layer to prevent the penetration of water and hazardous or toxic materials into the earth, and to provide lagoons, ponds and other water containment areas. Water-swellable clays, such as bentonite, have been applied directly to the soil surface and impacted in place, as disclosed in this assignee's prior U.S. Pat. No. 3,986,365. In addition, many different multi-layered articles of manufacture containing a water-swellable clay, such as bentonite, have been manufactured by adhesively securing the water-swellable clay to major interior surfaces of flexible sheet materials for application to the soil surface in abutting or overlapping relation of adjoining multi-layered articles. Examples of flexible sheet materials containing adhesively secured water-swellable clays are found in the following U.S. Pat. Nos. Clem 4,467,015; Clem 4,501,788; McGroarty et al 4,693,923; Harriett 4,656,062; and Harriett 4,787,780.

U.K. published patent application GB 2,202,185A discloses a layer of water-swellable bentonite between flexible layers that have been needle punched together in a needle loom that secures material from a lower layer of non-woven textile material to an upper layer of non-woven textile material, and secures material from an upper non-woven textile material to the lower non-woven textile material.

Another water proofing barrier, disclosed in Blias U.S. Pat. No. 4,344,722, is constructed in the field by applying a first flexible, water-permeable fabric layer, overlaying a thickness of water-swellable clay material and applying an overlayer of the same flexible, water-permeable fabric thereover. Other patents disclosing the use of water-impermeable layers for protecting a soil surface include British Patent Specification 1,059,363; British Patent Specification 1,029,513 and British Patent Specification 1,129,840.

Other prior art patents, for example Clem U.S. Pat. No. 4,501,788 and the McGroarty U.S. Pat. No. 4,693,923, disclose multi-layered flexible articles containing a water-swellable clay and having overlap areas containing no clay so that one sheet of the multi-layer article can be overlapped over an adjacent article on the area that is void of clay.

Problems prevalent with the use of the moisture-impervious panels disclosed in the Clem U.S. Pat. Nos. 3,186,896 and 4,501,788 and the McGroarty U.S. Pat. No. 4,693,923, are that 1) overlapping paper or cardboard facing sheets used to form the exterior surfaces of these panels require a period of time in order to become saturated sufficiently to permit water to penetrate the sheet and contact the intermediate water-swellable clay layer, and 2) the water-swellable clay is imperfectly abutted together at the seam so that water can penetrate through the panels at the seam areas. During this facing sheet saturation period, and initial multi-layer article water contact period, water in contact with the panels flows laterally over the facing sheet and can find a seam, crack, crevice or panel-damage area so that water can penetrate the panel, or penetrate between adjacent panels, at one or more locations before the intermediate water-swellable clay layer has had sufficient time to hydrate sufficiently and swell laterally to prevent this water penetration. Though such water damage will probably be of a relatively minor consequence, caused during a relatively short period of time until the intermediate water-swellable clay layer has had sufficient water contact for hydration, with repeated leakage, such water damage can be substantial and can create damage areas capable of substantial water penetration over time, in addition to being very costly to excavate and repair. Although this problem has existed since the first use of these water-impervious panels, for over twenty years, presenting a long-felt need in this art, to date this problem has not been solved.

Many attempts have been made to improve upon the water-impermeability of multi-layer articles of manufacture containing bentonite. The following patents represent efforts to provide a water-impervious sheet material containing adhesively secured water-swellable clays: Clem U.S. Pat. No. 4,467,015; Clem U.S. Pat. No. 4,501,788; McGroarty et al U.S. Pat. No. 4,693,923; Harriett U.S. Pat. No. 4,656,062; and Harriett U.S. Pat. No. 4,787,780. Other patents disclose the use of water-impermeable layers for protecting a soil surface, such as British patent specification 1,059,363; British patent specification 1,129,513 and British patent specification 1,129,840. Blias U.S. Pat. No. 4,344,722 discloses a water barrier constructed in the field by applying a first flexible, water-permeable fabric layer to a soil surface, overlaying a thickness of water-swellable clay material, and applying an overlayer of the same flexible, water-permeable fabric thereover. This eliminates the need for applying an adhesive to secure the clay to fabric sheets, but is expensive since the barrier material cannot be preformed but must be constructed in the field. U.K. published patent application GB 2,202,185A discloses a layer of water-swellable bentonite between flexible layers that have been needle punched together in a needle loom.

The following two patents disclose envelopes of water-absorbent polyacrylates that degrade in the liquid being absorbed to immobilize the liquid: Cullen U.S. Pat. No. 4,748,069 and Cullen et al U.S. Pat. No. 4,749,600. Agro et al U.S. Pat. No. 3,561,177 discloses a bentonite caulking rope enclosed in a water-soluble material, but neither discloses nor suggests its use at multi-layer article seam areas.

The above-described problems inherent with attempting to fit together adjacent water sealing articles in order to prevent water from leaking through the joints or seams are overcome in accordance with the principles of the present invention by providing a elongate, flexible confined mass of the water-swellable clay for positioning between, under or over adjacent sheets of water-barrier material manufactured in such a way that the elongate, confined mass of water-swellable clay will hydrate to prevent water from penetrating the seam or joint area.

SUMMARY OF THE INVENTION

In brief, the present invention is directed to an article of manufacture comprising an elongate confined mass of a water-swellable clay for sealing joints or seams between adjacent water-barrier materials or for plugging defects or other unsealed areas adjacent to a water-barrier layer. The elongate, confined mass of water-swellable clay is manufactured in any desired cross-sectional shape or configuration e.g. circular, eliptical, rectangular, square, and the like and can be manufactured in roll form for dispensing individual confined masses of water-swellable clay individually, or a roll of confined masses of water-swellable clay can be manufactured such that the spacing between confined masses of clay is approximately equal to the spacing that will be encountered when adjacent water-barrier layers are disposed in their intended location to provide another layer of water-barrier material between successive confined masses of water-swellable clay. The water-swellable clay is confined within a layer of material that permits the entrance of water to contact the water-swellable clay for hydration of the clay, such as by being water-porous or water-soluble and such that upon sufficient hydration of the confined mass of water-swellable clay, the confining layer will dissolve sufficiently, burst or tear to permit relatively free movement of the hydrating and expanding water-swellable clay.

Accordingly, an aspect of the present invention is to provide a new and improved article of manufacture adapted to seal seams between adjacent water sealing articles to prevent water from penetrating an area between the water-sealing articles.

Another aspect of the present invention is to provide a new and improved article of manufacture including a water-swellable clay, such as bentonite, the article including a water-penetrable or water-soluble flexible wrapping material containing the water-swellable clay, wherein the flexible wrapping material will dissolve or tear upon bentonite clay hydration and expansion.

Another aspect of the present invention is to provide a new and improved water-sealing article including a plurality of adjacent water-sealing sheets that are water-impermeable by virtue of either being manufactured to contain water-impermeable sheet material or to contain a water-swellable clay, said water-sealing article including an elongated envelope of water-swellable clay disposed at seam areas between the adjacent water-sealing sheets to prevent water penetration at the seams.

Still another aspect of the present invention is to provide a new and improved elongated article of manufacture including a water-swellable clay contained within an elongated envelope of water-impermeable material wherein at least one edge of the water-impermeable material is sewn or otherwise fastened together, to confine the water-swellable clay within the envelope and to provide water entry apertures and a line of structural weakness in the water-impermeable material so that water can enter the envelope to hydrate and swell the water-swellable clay and burst the envelope along the line of weakness.

BRIEF DESCRIPTION OF THE DRAWINGS

The above and other advantages and aspects of the present invention are better understood with resort to the drawings showing the preferred embodiments of the invention wherein:

FIG. 1 is a perspective view of a water-pervious elongate article of the present invention;

FIG. 1A is a perspective view of a water-pervious elongate article of the present invention that has a longitudinal seam that is weaker than the remainder of the article;

FIG. 2 is a perspective view showing the elongate article of FIG. 1 disposed to seal a joint or seam between overlapping, adjacent, water-sealing articles;

FIG. 3 is a perspective view showing, in solid lines, the elongate article of FIG. 1 disposed above the seam of two adjacent water-sealing articles, and alternatively having, in dashed lines, the elongated article of FIG. 1 disposed below the seam of two adjacent water sealing articles;

FIG. 4 is a perspective view of the elongate article, as shown in FIG. 2, showing the disposition of partially or fully hydrated water-swellable clay after decomposition or bursting of the clay envelope;

FIG. 5 is a perspective view showing the elongate article of FIG. 1 disposed to seal a joint or seam between overlapping, adjacent, multi-layered water-sealing articles;

FIG. 6 is a perspective view of another embodiment of the present invention showing an article of manufacture including a plurality of successive, elongate water-swellable clay-enveloped articles manufactured in a continuous sheet of separable articles;

FIG. 7 is a perspective view of the article of manufacture of FIG. 6 in roll form;

FIG. 8 is a perspective view of the article of FIG. 6 wherein the individual clay-containing envelopes are manufactured in rectangular cross-sectional shape and are separable one from the other.

FIG. 9 is a perspective view of another embodiment of the present invention showing a strip of a multi-layer article overlapping a seam area of two multi-layer water-sealing articles to seal the seam therebetween; and FIG. 10 is a perspective view of another embodiment of the present invention wherein the clay-enveloping wrapping material is secured together around a water-swellable clay using latching means, such as VELCRO®.

DETAILED DESCRIPTION OF THE PREFERRED EMBODIMENTS

Turning now to the drawings, and initially to FIGS 1–4, there is illustrated an article of manufacture, generally designated by reference numeral 10, that is adapted for disposition along a seam or joint between adjacent water-sealing articles, generally designated by reference numerals 12 and 14. As shown in FIGS. 2–5 and 9, water-sealing articles 12 or 12A and 14 or 14A commonly are positioned over an area to be protected against water contact by abutting the articles 12 and 14 one against the other or by overlapping one of the articles e.g. 14 over the other water-sealing article 12. As shown in Clem U.S. Pat. No. 4,501,788, it has been proposed in the past to overlap adjacent articles or to provide a separate layer of material beneath adjacent articles in an attempt to provide continuous sealing over the entire area to be protected. While these installation methods are helpful, they do not solve all of the seepage problems that occur at the joints or seams between adjacent water-sealing articles.

In accordance with an important feature of the present invention, the articles of manufacture 10, manufactured in accordance with the principles of one embodiment of the present invention, are elongate masses of a water-swellable clay, such as bentonite 11, confined within a wrapper or envelope of a water-degradable or water-porous flexible material 13 that will degrade or burst upon sufficient water contact to allow the water-swellable clay to hydrate and expand in the area where the two adjacent water-sealing articles 12 or 12A and 14 or 14A abut together or are overlapped, substantially without hindrance from the envelope material.

The water-swellable colloidal clay 11 that essentially fills the enveloping material 13 to form the joint sealing articles 10 of the present invention is any water-swellable colloidal clay which will hydrate in the presence of water, i.e., will swell in the presence of water. In accordance with a preferred embodiment of the present invention, the colloidal clay is bentonite. To achieve the full advantage of the preferred embodiment, the bentonite is sodium bentonite which is basically a hydratable montmorillonite clay of the type generally found in the Black Hills region of South Dakota and Wyoming. This clay has sodium as a predominant exchange ion. However, the bentonite utilized in accordance with the present invention may also contain other cations such as magnesium and iron. There are cases wherein a montmorillonite predominant in calcium ions can be converted to a high swelling sodium variety through a well known process called "peptizing". The colloidal clay utilized in this invention may be one or more peptized bentonites. The colloidal clay may also be any member of the dioctahedral or trioctahedral smectite group or mixtures thereof. Examples are Beidellite, Nontronite, Hectorite, Sepiolite and Saponite. To achieve the full advantage of the present invention, the colloidal clay, i.e., bentonite, generally is finely divided as known for use in water barrier panels and the like, i.e., 20 to 350 mesh, preferably 20 to 50 mesh.

Examples of water-soluble materials useful as a degradable enveloping material 13 are a polyvinyl alcohol sheet or film material having a thickness of about 0.5 mm to about 20 mm; dehydrated sheets of gelatin material, and the like.

Examples of water-permeable materials useful as the enveloping material 13 that will burst or tear upon hydration of the water-swellable clay 11 include polyolefin non-woven fabrics, such as polyethylene, polypropylene, and the like. Such flexible fabric materials can be constructed to include a line of weakening at a seam 15 (FIG. 1A) that is not strongly secured at the seam, making the seam relatively easy to break upon clay hydration. For example, the seam can be secured together with a water-soluble thread so that the seam breaks or dissolves upon water contact. To achieve the full advantage of the present invention, the water-permeable fabric, when in place on the clay layer, should have a water-permeability of at least 1 liter per hour per square meter under 10 centimeters of constant water pressure.

As shown in FIG. 3, the article of manufacture 10 of the present invention can be disposed either above or below adjacent water-sealing articles 12 or 12A and 14 or 14A in contact with both water-sealing articles 12 or 12A and 14 or 14A and in alignment with a seam or joint 16 defined by a continuous or intermittent space disposed along adjacent edges 18 or 18A and 20 or 20A of the water-sealing articles 12 or 12A and 14 or 14A, respectively.

As shown in FIGS. 2, 4 and 5, the article of manufacture 10, manufactured in accordance with the present invention also can be disposed on an upper surface 22 of one of the water-sealing articles, e.g. 12 or 12A, in alignment with a free edge, e.g. 18 or 18A and overlapped with an overlapping portion 24 or 24A of the adjacent water-sealing article 14 or 14A.

As shown in FIG. 4, water that seeps under free edge 20 of water-sealing article 14, and under the overlapping portion 24 of water-sealing article 14 will contact the article of manufacture 10 of the present invention, thereby causing the water-swellable clay material 11 to hydrate and swell and cause the enveloping material 13 to either degrade or burst so that the water-swellable clay material 11 will longitudinally and transversely expand to fill any seam or joint area that was not previously filled with water-swellable clay to assure that no water seeps between the adjacent water-sealing articles 12 and 14.

As shown in FIG. 5, the water-sealing articles generally designated 12A and 14A can be identical multi-layer articles including a layer of water-swellable clay 11 disposed above a sheet material, e.g. fabric layer 26 or sandwiched between a lower sheet material, e.g. fabric layer 26 and an upper sheet material, e.g. fabric layer 28. The sheet material layers 26 and 28 can be woven or non-woven water-penetrable fabrics or water-impermeable polymeric films, e.g. polyethylene. The sheet material layers 26 and 28 confine the water-swellable clay 11 therebetween and can be either water-penetrable or water-impervious and preferably are geotechnic woven or non-woven fabrics.

In accordance with another important embodiment of the present invention shown in FIG. 9, a seam-sealing article in the form of an elongated multi-layer article, generally designated by reference numeral 30, can be manufactured as an elongate strip of multi-layer construction, similar or identical, with the exception of dimensions, to the two water-sealing articles 12A and 14A shown in FIGS. 5 and 10. As described with reference to FIG. 5, water-sealing articles 12A and 14A are formed from upper and lower sheet materials 26 and 28 that can be woven or non-woven fabrics, a woven fabric on one side, e.g. 28 and a non-woven fabric on the other, e.g. 26; water-impermeable films or sheets on both sides, 26 and 28; or a water-impermeable film or sheet on one side, e.g. 26 and a fabric on the other side, e.g. 28. Similarly, the seam-sealing article 30 can be manufactured identical to water-sealing articles 12A and 14A, but cut into elongate strips 30 and placed to cover the overlapping free edge 20A of article 14A so that a lower surface of the edge-sealing article 30 lies on a top surface of the upper sheet material 28 of both water-sealing articles 12A and 14A in alignment with and disposed over the free edge 20A of the overlying water-sealing article 14A. Alternatively, the elongate seam-sealing article 30 can be a single layer formed from a cohesive bentonite composition, such as the compositions of U.S. Pat. Nos. 4,209,568; 4,279,547; 4,366,284; 4,534,925; 4,534,926 or 4,668,724, which patents are hereby incorporated by reference.

As shown in the embodiment of FIG. 11, the water-porous flexible material 13 forming the enveloping or wrapping material confining the bentonite 11 to form the seam-sealing article 10 includes a latching means, e.g. VELCRO®, including a plurality of latching hooks 40 operatively connected to one free longitudinal edge 42 of the water-porous material 13 adapted to be secured to an opposite longitudinal edge 14 of the material 13 to confine the water-swellable clay 11 within the meterial in an elongate configuration. The material 13 of FIG. 11 can be a water-porous fabric or a water-impermeable material since an intermittent longitudinal slit will remain between free edges 42 and 44 for water penetration.

In accordance with another important embodiment of the present invention, as shown in FIG. 6-8, the articles of manufacture 10 made in accordance with the present invention, also can be made in continuous roll form including multiple, spaced elongate masses of a water-swellable clay 11 enveloped within the water-degradable or water-porous wrapping material 13, such as by depositing the plurality of spaced elongate masses of water-swellable clay 11 onto a lower or first sheet of enveloping material 13, and then covering the plurality of elongate masses of water-swellable clay 11 with an upper or second sheet of enveloping material 13A. The first and second sheets of enveloping material 13 and 13A then are sealed together between the spaced masses of water-swellable clay 11, as shown in FIGS. 6 and 7. Perforations 30 can be provided along the entire length of the sealed area between adjacent, spaced elongate masses of bentonite clay 11 so that individual elongate articles of manufacture 10 can be removed from the continuously manufactured plurality of articles 10. To achieve the full advantage of this embodiment of the present invention, the enveloping sheet material layers 13 and 13A include a thermoplastic fiber material or layer capable of being heat sealed together. At the same time that the sheet material layers 13 and 13A are heat sealed together between spaced articles 10, perforations are formed within the heat sealed area. In this manner, individual elongate joint or seam-sealing articles 10 can be removed from the remainder of the plurality of articles 10, and the articles 10 can be disposed in a desired location for sealing seams or joints between adjacent water-sealing articles.

It should be understood that the present disclosure has been made only by way of preferred embodiments and that numerous changes in details of construction, combination and arrangement of parts can be resorted to without departing from the spirit and scope of the invention as hereunder claimed.

What is claimed and sought to be secured by Letters Patent of the United States is:

1. An article of manufacture in tube form adapted for disposition along a seam or joint between adjacent bentonite-containing water-sealing articles of preventing water from seeping between said adjacent water-sealing articles comprising:

an elongated tubular mass of a water-swellable clay enveloped within a tube-shaped wrapper consisting essentially of a water-porous fabric having a longitudinal seam in the enveloping material, said seam having a bursting strength lower than a bursting strength of the fabric such that upon contact of the water-swellable clay with water, the clay will hydrate and expand thereby causing the water-porous material to tear along the seam upon a predetermined pressure from the clay against the water-porous fabric thereby enabling the clay to expand through said seam between said adjacent water-sealing articles to prevent water from seeping between said water-sealing articles.

2. The article of claim 1 wherein the water-porous fabric containing the water-swellable clay consists of a synthetic fabric.

3. The article of claim 2 wherein the water-porous fabric is a non-woven polyolefin fabric material.

4. The article of claim 3 wherein the non-woven polyolefin fabric is selected form the group consisting of polyethylene, polypropylene, and mixtures.

5. The article of claim 1 wherein the clay is bentonite.

6. The article of claim 1 wherein the water-porous flexible fabric includes latching means operatively connected to one free edge of the material and adapted to be secured to another free edge of the material for confining the water-swellable clay within the material.

7. The article of claim 2 wherein the fabric layer has a water-permeability of at least 1 liter per hour per square meter under 10 centimeters of constant water pressure.

8. A composite article comprising two adjacent bentonite-containing water-sealing sheet articles each manufactured to include material that prevents the passage of water through said articles, and a tubular seam-sealing article disposed in alignment with a seam defined by a line of overlapping or abutment of said two adjacent water-sealing articles for preventing water from seeping between said adjacent water-sealing articles, said tubular seam-sealing article formed from an elongated tubular mass of a water-swellable clay enveloped within a tubular wrapper consisting essentially of a water-porous flexible fabric material having a longitudinal seam in the enveloping fabric material, said seam having a bursting strength lower than a bursting strength of the fabric material such that the water-porous fabric material will permit the passage of water therethrough sufficiently upon contact with water to enable the clay to expand through said fabric seam to substantially block the passage of water through said seam of said adjacent water sealing articles.

9. The composite article of claim 8 wherein the fabric water-porous material containing the water-swellable clay consists essentially of a synthetic fabric.

10. The composite article of claim 9 wherein the water-porous fabric material is a non-woven polyolefin fabric material.

11. The composite article of claim 10 wherein the non-woven polyolefin fabric is selected from the group consisting of polyethylene, polypropylene, and mixtures.

12. The article of claim 8 wherein the clay is bentonite.

13. The article of claim 9 wherein the fabric layer has a water-permeability of at least 1 liter per hour per square meter under 10 centimeters of constant water pressure.

14. The article of claim 9 wherein the water-porous flexible fabric material includes latching means operatively connected to one free edge of the fabric and adapted to be secured to another free edge of the fabric for confining the water-swellable clay within the fabric.

15. An article of manufacture adapted to seal a plurality of water seepage areas comprising:

a first elongated tubular mass of a water-swellable clay confined within a first water-penetrable tubular envelope consisting essentially of a fabric material and having a longitudinal seam wherein the seam has a bursting strength less than a bursting of the fabric material, said seam adapted to degrade or burst upon sufficient water contact to allow the first mass of water-swellable clay to expand substantially without hindrance from the first envelope;

said first tubular envelope integrally connected to and spaced from a second tubular envelope containing a second tubular mass of a water-swellable clay, said second envelope consisting essentially of a fabric material and having a longitudinal seam wherein the seam has a bursting strength less than a bursting of the fabric material, said seam adapted to degrade or burst upon sufficient water contact to allow the second mass of water-swellable clay to expand substantially without hindrance from the second envelope, and means for separating said first tubular mass from said second tubular mass.

16. The article of claim 15 wherein the first and second envelopes consist essentially of a synthetic fabric.

17. The article of claim 16 wherein the synthetic fabric is a non-woven polyolefin fabric material.

18. The article of claim 17 wherein the synthetic fabric is selected from the group consisting of polyethylene, polypropylene and mixtures thereof.

* * * * *